May 7, 1935.    R. M. SMITH    2,000,197
METHOD OF TREATING WATER
Filed April 27, 1932
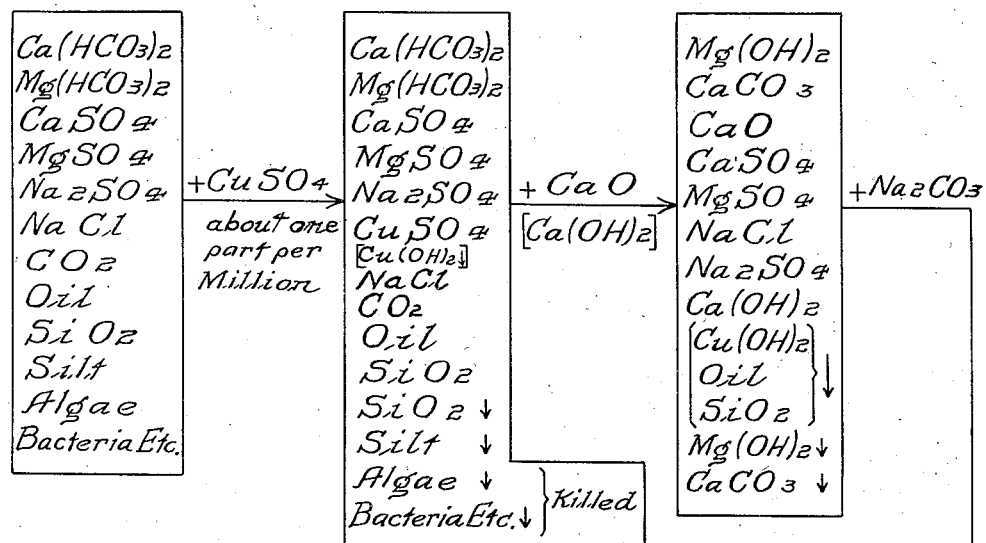
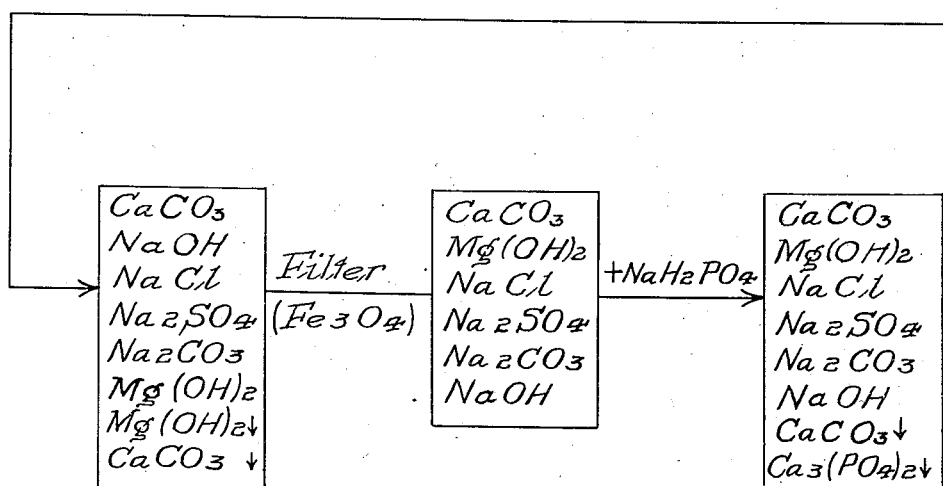
WITNESS
F. J. Hartman
INVENTOR
Robert M. Smith
BY George N. Hellet
ATTORNEY Patented May 7, 1935

2,000,197

UNITED STATES PATENT OFFICE 2,000,197

METHOD OF TREATING WATER

Robert M. Smith, Youngstown, Ohio

Application April 27, 1932, Serial No. 607,694

4 Claims. (Cl. 210—23)

My invention relates to the treating of water for the purpose of removing impurities which, if present, would seriously interfere with the efficiency of the apparatus in which the water is to be utilized such, for example, as steam boilers, evaporators, cooling coils, and the like, and more particularly to an improved method for removing scale producing constituents from the water and imparting to it certain characteristics which are advantageous when it is used in such apparatus.

It is well known that all water derived from underground sources, from lakes, ponds, streams, etc., contains, to some extent at least, impurities of various kinds, including dissolved salts and other minerals in solution and, also, organic and inorganic matter in suspension, algae and other living organisms, which are inimical to the use of the water for industrial purposes through their tendency to adhere to surfaces and to form scale which is deposited in or on surfaces of headers, pipes and tubes of the boilers, cooling coils and the like, bringing about heat insulation and in some cases corrosion of the metal parts and/or foaming in the boiler, even though the water is entirely suitable for drinking purposes or certain other uses.

Many methods of water treatment have heretofore been devised and it has been found that by the addition of certain reagents some of the undesirable constituents may be removed, but so far as I am aware none of these methods has been fully effective to render the water satisfactory for use in large quantities for industrial purposes of the character of those to which I have referred.

Moreover, I have found that water having relatively high quantities of inorganic salts in solution and substantially free of suspended matter, foams under the influence of heat very much less than substantially pure water containing only relatively small quantities of suspended matter. Consequently, as foaming is extremely undesirable in steam boilers and the like, and as it is not essential that chemically pure water be employed therein, it is apparent that the removal of suspended matter is advantageous even when accompanied by an increase in the concentration of compounds in solution in the water.

Water from natural sources ordinarily contains bicarbonates of calcium and magnesium, sulphates of calcium and magnesium, sulphate and chloride of sodium and free and half-bound carbon dioxide and other scale-forming or otherwise undesirable inorganic compounds including various silicon compounds together with small quantities of organic matter, such as oil, algae, spores and bacteria of various kinds and silt of indeterminate chemical composition, and the principal object of my invention is to provide an improved method of removing certain of these constituents which are inimical to the satisfactory use of the water in steam boilers, generators, evaporators and the like and of rendering the remaining constituents neutral in this respect, so that although after the water has been treated it may contain a relatively high concentration of chemical impurities in solution, it is harmless to the boiler or other apparatus in which it is employed in that scale or other insulatory material is not deposited, nor does any corrosion result, while under certain conditions the presence of these solutes reduces foaming and is otherwise advantageous.

A further object of my invention is to provide an improved method for converting certain scale forming materials ordinarily found in water from natural sources into non-scale forming compounds, and to set up a condition which inhibits or prevents the deposition of scale forming compounds.

Other purposes, objects and advantages of the invention will hereafter more fully appear or will be understood from the following description of one manner of performing it, reference being had to the accompanying diagrammatic flow sheet representing the various treatments to which the water is subjected.

In the practice of the invention, and as will appear from the said drawing, water containing some or all of the impurities hereinabove noted is initially treated by the addition of copper sulphate in the proportion of about one part more or less per million, this treatment probably being effective to kill the algae and other living organisms, with the result that substantially all the organic matter, including these organisms, is precipitated in the form of a heavy slime to the bottom of a settling tank into which the water is introduced after the copper sulphate treatment, and if small quantities of alkali be present, such as calcium hydrate, the copper sulphate may react therewith and precipitate as flocculent copper hydrate, assisting, by its inclusion of suspended matter, in the removal of the latter. This treatment therefore removes substantially all of the sand and other suspended silicates, the silt and other insoluble constituents generally with the result that the water, after settling, contains calcium and magnesium bicarbonates, calcium magnesium and possibly copper sulphate and other inorganic salts, and also, perhaps, a very small quantity of silicon trioxide in solution and some free and half-bound carbon dioxide.

The water is then preferably treated with sufficient lime to remove whatever carbon dioxide it contains and convert the bicarbonates into hydroxides and/or insoluble normal carbonates, although it is to be understood that they may also easily be converted thereinto by heating, if desired, either treatment resulting in the removal of most of the magnesium and calcium bicarbonates by precipitation thereof in the form of normal carbonates and/or hydrates of the respective elements, and in the removal of any remaining copper of the previously added copper sulphate in the form of copper hydrate as a flocculent precipitate which assists the removal, by occlusion, of any suspended solids such as silt, sand and the like which may still be present. The lime treatment will ordinarily be preferred as it is generally the less expensive.

Thus after the precipitation, as just described, of the copper and the major portions of the magnesium and calcium compounds, the water still contains the original sodium chloride, sodium sulphate, and dissolved organic materials together with very small quantities of calcium carbonate and magnesium hydrate and substantially all the original sulphates together with additional calcium sulphate resulting from the lime treatment. As many of these materials are of such nature as to produce scale if the water containing them were used in a boiler at this stage of its treatment, the next step in my method consists of converting these scale forming materials either into insoluble precipitates for subsequent removal or into soluble compounds which will remain in solution in the water when used in a boiler and assist in preventing formation of scale. For this purpose, treatment of the water with sodium carbonate is next desirably effected, the carbonate reacting with the sulphates in the water to produce additional soluble sodium sulphate, above whatever quantity may already be present, and precipitate out substantially all the remaining calcium and magnesium compounds. After this treatment the small quantity of calcium carbonate naturally soluble in water still remains in solution, but the insoluble precipitates formed either settle as a sludge in the bottom of the precipitating tank or may be conveniently removed by filtering the water through a bed of magnetite ore, either by gravity or pressure. I have found that this ore is particularly desirable as a filter material for use at this stage of my method for the reasons that it is cheaper than ordinary sand and the silicon content of the water remains substantially unaffected thereby, whereas the passage of the water through a sand filter when in this condition would result in an increase of its silicon content, through solution of the silicates in the water because of its alkaline character.

After filtration through the magnetite ore, however, the water is substantially satisfactory for boiler purposes except for the small quantity of calcium carbonate which still remains in solution and which may be precipitated out as calcium phosphate by the addition of a soluble phosphate, preferably mono-sodium phosphate. I prefer to use less phosphate than the amount theoretically necessary to precipitate all the calcium carbonate present, for even though some of the carbonate remains in solution after the phosphate treatment, I have found that a calcium carbonate scale does not form when the water is used in subsequent boiler or like operations. More particularly, as the limits of solubility of calcium carbonate vary from 25 to 51 parts per million in accordance with the temperature, it would be theoretically necessary to add mono-sodium-phosphate in quantities from 16.71 to 34.1 parts per million to completely precipitate the calcium carbonate, while in the actual practice of methods heretofore used in which some calcium carbonate is held in suspension in the water by algæ and the like in addition to that in solution, it has been deemed necessary to add a considerably larger amount of phosphate to obtain satisfactory results. According to my method, however, I use only about 10% of the theoretically necessary quantity of the phosphate, namely, about 1.671 to 3.41 parts of mono-sodium phosphate per million, to precipitate a portion of the calcium carbonate, preferably in the water heaters before the water enters the boilers and, while thus substantially reducing the consumption of the relatively expensive phosphate, I obtain a highly desirable boiler water at a less cost than by methods heretofore practised. Moreover, the higher than normal total concentrations of soluble constituents in the water including calcium carbonate, sodium chloride, sodium sulphate, and certain other compounds, tend to reduce foaming and consequently the number of blow downs required in a given period of operation.

Water treated in accordance with my invention may advantageously be used in cooling coils and other cooling equipment with very beneficial results as well as in boilers, for, as has been shown, the production of scale is inhibited by the presence of the solutes created or retained in the water whereby greater efficiency in the cooling coils is maintained throughout relatively long periods of use, while the cooling equipment does not require the frequent cleaning heretofore necessary to prevent its becoming burned out during periods of ineffectual cooling resulting from heavy deposits of scale. The absence of scale or slime forming materials furthermore permits heat to be absorbed by the water through the walls of the cooling tubes very much more rapidly than when even a relatively thin layer of scale and/or slime is present between the water and the metal of the cooling unit, since the insulating effect of coatings of these materials is relatively high; consequently, when water treated in accordance with the present method is utilized, substantial reduction in the effective cooling area is permitted without inimical results so that, for example, the cooling chambers of blast furnace tuyères can be reduced in size as much as 75% in some cases. Additionally, as the water treated by my improved method is alkaline in its chemical reactions, the corrosion of zinc or other non-ferrous metals frequently used for tubes and other parts contacted by the water is substantially less than when water having an acid reaction is employed, since the latter attacks the metals, particularly when heated, and is especially corrosive at the meeting points of different kinds of metal where contact between two different metals in the presence of an acidic solution sets up a galvanic action, thereby rapidly electrolyzing the respective parts.

While I have herein specifically described the preferred manner of performing the method of my invention, I wish it to be distinctly understood that the latter is not to be considered as restricted or confined thereto since modifications in the order of performing certain of the steps and in certain features of the individual steps, as well as in the invention broadly, will readily occur to those skilled in the art and may be made without departing from the spirit and scope of the invention as defined in the appended claims.

Having thus described my invention, I claim and desire to protect by Letters Patent of the United States:

1. A method of water treatment which comprises the steps of adding copper sulphate to the water in proportion of approximately one part per million to thereby destroy living organisms and precipitate slime and other organic materials, treating the water with lime to neutralize acidic compounds therein and precipitate the copper, adding sodium carbonate to precipitate scale forming compounds, filtering through magnetite ore, and finally adding mono-sodium phosphate in an amount less than that theoretically required to precipitate all residual dissolved calcium and magnesium compounds.

2. A method of treating water preparatory to its use for industrial purposes which comprises the steps of adding copper sulphate, then neutralizing the acidic compounds present, adding sodium carbonate, filtering through magnetite ore and finally adding a phosphate of an alkali metal in an amount less than that theoretically required for complete combination with all residual scale producing compounds in solution.

3. A method of treating water preparatory to its use for industrial purposes which comprises the steps of adding copper sulphate in proportion of approximately one part per million, then subjecting the water to the action of lime, adding sodium carbonate, filtering through a bed of magnetite ore and finally adding mono-sodium-phosphate.

4. A method of treating feed water for boilers comprising the steps of precipitating living organisms from the raw water by addition of copper sulphate in proportion of approximately one part per million, then neutralizing acidic compounds by addition of lime, converting calcium and magnesium salts into their respective carbonates by addition of sodium carbonate, filtering to remove solids in suspension, and finally adding approximately 10% of the amount of mono-sodium-phosphate theoretically necessary to entirely precipitate all residual calcium and magnesium compounds in solution.

ROBERT M. SMITH.

CERTIFICATE OF CORRECTION.

Patent No. 2,000,197.　　　　　　　　　　　　　　　　　　May 7, 1935.

ROBERT M. SMITH.

It is hereby certified that error appears in the printed specification of the above numbered patent requiring correction as follows: Page 3, second column, line 12, claim 3, after "phosphate" and before the period, insert the words in an amount insufficient to precipitate all calcium and magnesium in solution; and that the said Letters Patent should be read with this correction therein that the same may conform to the record of the case in the Patent Office.

Signed and sealed this 25th day of June, A. D. 1935.

(Seal)

Bryan M. Battey
Acting Commissioner of Patents.